UNITED STATES PATENT OFFICE.

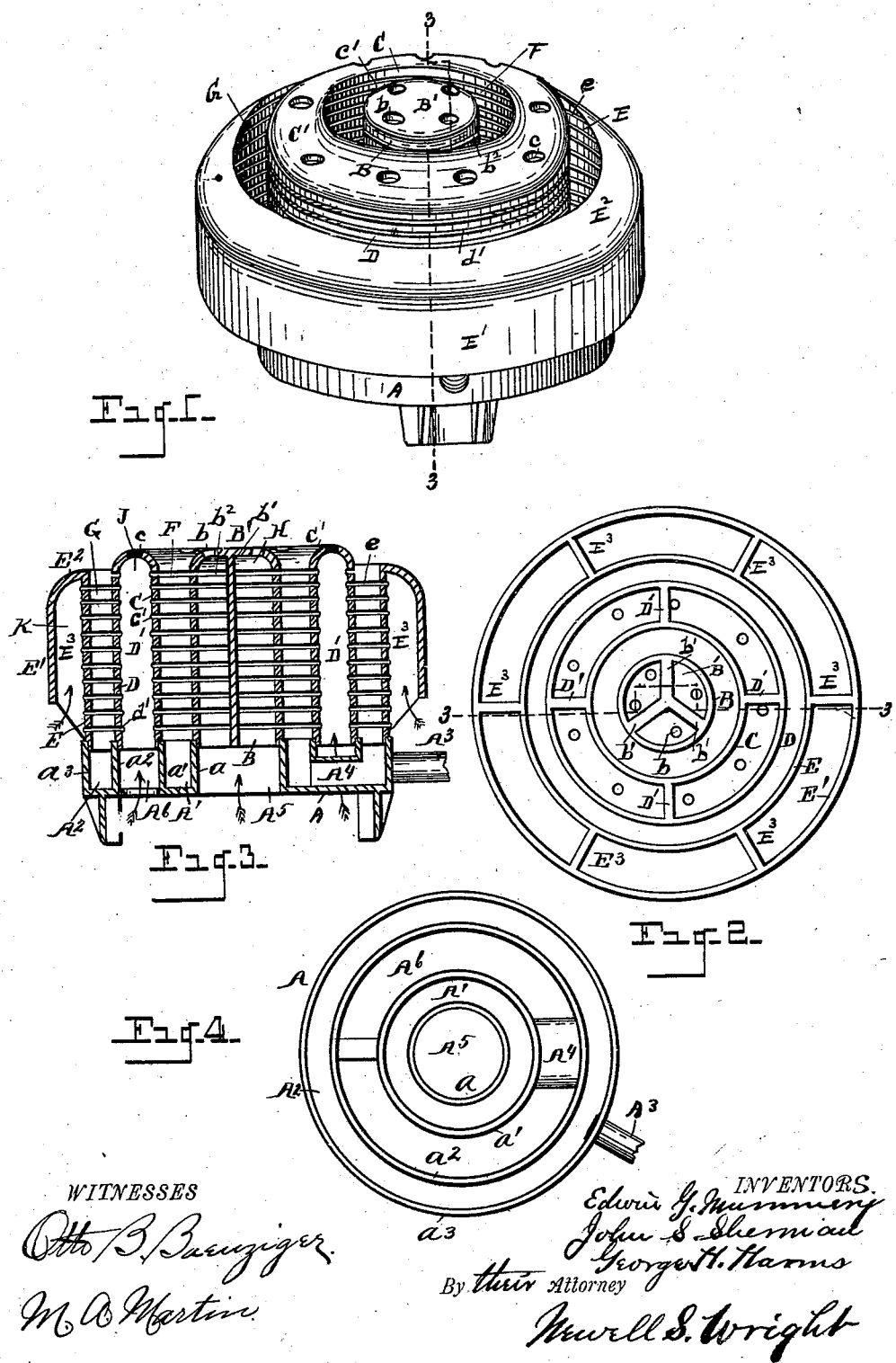

EDWIN G. MUMMERY, JOHN S. SHERMAN, AND GEORGE H. HARMS, OF DETROIT, MICHIGAN; SAID MUMMERY ASSIGNOR TO PAUL C. DULITZ, OF SAME PLACE.

HYDROCARBON-BURNER.

SPECIFICATION forming part of Letters Patent No. 547,562, dated October 8, 1895.

Application filed January 14, 1895. Serial No. 534,825. (No model.)

*To all whom it may concern:*

Be it known that we, EDWIN G. MUMMERY, JOHN S. SHERMAN, and GEORGE H. HARMS, citizens of the United States, residing at Detroit, county of Wayne, State of Michigan, have invented a certain new and useful Improvement in Hydrocarbon-Burners; and we declare the following to be a full, clear, and exact description of the invention, such as will enable others skilled in the art to which it appertains to make and use the same, reference being had to the accompanying drawings, which form a part of this specification.

Our invention has for its object certain new and useful improvements in a hydrocarbon-burner; and it consists of the construction, combination, and arrangement of devices and appliances hereinafter specified and claimed, and illustrated in the accompanying drawings, in which—

Figure 1 is a view in perspective embodying our invention. Fig. 2 is an inverted plan view of the air-inlet walls. Fig. 3 is a vertical section on the line 3 3, Figs. 1 and 2. Fig. 4 is a plan view of the base, the air-inlet walls being removed.

Our invention is particularly designed as an improvement upon a patent granted to Edwin G. Mummery March 20, 1894, No. 516,872. Said patent embraces, in combination, a base constructed with an interior channel and an exterior surrounding channel communicating with the interior channel and spaced therefrom, forming openings intermediate said channels, upwardly-projecting perforated walls located upon said base about said openings, respectively, and forming an intermediate chamber above the interior channel, a closed cap over each of said openings at the top of said perforated walls, a perforated drum surrounding said perforated walls and spaced therefrom, forming an intermediate chamber above the exterior channel at the top and communicating with said intermediate chamber, and an inclosing imperforate drum surrounding said perforated drum and spaced therefrom and forming an air-space therebetween open at the bottom and closed at the top, together with other features of construction.

Our present invention has specific reference to the novel construction of the slotted walls located upon the base about the openings therethrough. In other respects our present device is essentially the same as that embodied in said patent.

In order to fully describe and explain the novel features of our present invention, we have shown in the accompanying drawings a complete burner, with the construction embodied in said patent modified to embrace the improvements made in the development of said burner, as herein set forth.

The particular manner in which we construct the perforated or slotted walls constituting the air-inlet plates as now embodied in the burner made in accordance with said patent is found to be of special utility and efficiency, affording perfect combustion, and consequently a perfect flame, whereby the heating capacity of the fuel is utilized to the fullest possible extent without the production of any odor and without the deposit of carbon to close the burner.

Our improved burner secures a thorough and complete vaporization of the fuel, as well as a thorough admixture of air therewith to secure perfect combustion, the burner being at the same time durable and without liability of getting out of order from any cause.

We carry out our invention as follows:

As shown, A represents a base constructed with an interior channel $A'$ and with an exterior channel $A^2$, a feed-pipe $A^3$, leading into the exterior channel, and the exterior channel communicating with the interior channel as through a connecting-passage $A^4$. The feed-pipe $A^3$ may enter the exterior channel $A^2$ at any desired point. Within the interior channel $A'$, which is shown of circular form, is an interior opening $A^5$, and between the two channels $A'$ and $A^2$ is an opening $A^6$, the channels $A'$ and $A^2$ constituting vapor-channels, and the openings $A^3$ $A^6$ constituting air-inlet openings. In the formation of the channels $A'$ $A^2$ the base is constructed with vertically-projecting flanges $a$ and $a'$ at the inner and outer peripheries of the channel $A'$ and with similar flanges $a^2$ and $a^3$ at the inner and outer peripheries of the channel $A^2$. The fuel from the feed-pipe $A^3$ flows freely into and throughout the interior and exterior channels of the base. About the interior opening $A^5$ of the base and thereabove we locate an upwardly-projecting perforated or slotted wall B, the wall being of a form corresponding to that of the channel A' and provided with a hood or covering B' at the top, said covering preferably having a series of perforations of slots $b$ in the top thereof. This slotted wall or air-inlet plate B, with its cover portion or hood B', we contemplate forming of a single casting provided with vertical partitions $b'$. After being cast the plate B is kerfed, preferably circumferentially, to form a series of annular slots or orifices, as indicated at $b^2$, the connecting-partitions $b'$ securely holding the parts together. The partitions are designed to be of sufficient heft and strength to prevent the body of the plate from warping. The perforations $b$ in the hood allow jets of air to pass therethrough into the center of the flame above the burner to assist in supporting combustion. This plate B we support upon the flange $a$, as shown, the lower edge of the plate being recessed to fit down within and seat upon said flange.

C and D represent air-inlet walls similarly supported upon the flanges $a'$ and $a^2$ of the base, said walls being provided with a hood C' at the top, the hood being preferably provided with a series of perforations $c$. The walls C D, with the hood, we form of an integral casting provided with strengthening and connecting partitions D', integrally connecting the two walls C D, said partitions D' being vertically extended to the hood.

The walls C D, after being cast, are each kerfed, preferably circumferentially, to form a series of annular slots or grooves $c'$ $d'$, through which air is admitted.

E denotes an air-inlet wall supported upon the flange $a^3$. E' is a non-foraminous wall spaced from the wall E and integrally connected therewith by a hood $E^2$. The wall E, with the wall E' and hood $E^2$, is formed of an integral casting provided with a series of partitions $E^3$ connecting the wall E with the wall E'. The wall E after being cast is kerfed to provide a series of annular slots or orifices $e$, through which air is admitted. It will thus appear that the slotted air-inlet wall B, together with the wall C, form therebetween a vapor or combustion chamber above the channel A', as indicated at F. So, also, the air-inlet walls D and E form therebetween an outer vapor or combustion chamber G, concentric with the chamber F. This construction also provides an air-chamber H above the inner opening $A^5$, and also an additional air-chamber above the opening $A^6$, as indicated at J. It will be evident that air from the chamber H will pass outwardly through the slots of the wall B into the combustion-chamber F, while at the same time air will pass inwardly from the chamber J through the slots in the wall C into said combustion-chamber F. Air will also pass from the chamber J outwardly into the combustion-chamber G and through the wall E inwardly into the chamber G. The space between the kerfed wall E and the non-foraminous wall E' forms an air-chamber K, open at its base. We thus have in the operation of the burner two concentric flames emitted from the chambers F and G, air being admitted into the inner circle of the frame through the slots or perforations $b$ above the burner and between the two circles of flame through the slots or perforations $c$ above the burner. By means of the slots or perforations $c$ we have found that the air admitted therethrough in jets tends to prevent effectually the inner circle of flame from spreading outwardly when a utensil is located above the flame—as a cooking utensil, for example—while the air thus admitted in jets through the perforations $c$ materially helps to support perfect combustion, inasmuch as these jets supply air between the two flames emitted from the chambers F and G. The flame is thus held firm and steady when a utensil is located thereabove, in consequence of the body of air thus supplied about the inner circle of flame above the burner to hold it from spreading. The air-inlet walls, being thus made of metallic castings, are necessarily heavier and thicker than if made of sheet metal, and when the burner is in operation these walls become heated and hold the heat to such a degree as to effectually facilitate the operation of vaporizing the fuel.

The construction of the slotted air-inlet walls with the partitions heretofore described to hold the parts together and make the structure firm is believed to be novel, while the partitions effectually prevent any warping of the walls, thus providing for a very durable as well as a most efficient burner. It will also be observed that the several slotted air-inlet walls are removable from the base, as they require no fastening of any kind, but simply rest upon the base, as above described.

What we claim as our invention is—

1. In a hydrocarbon burner, the combination of a base, a central kerfed air inlet wall provided with an integral perforated hood and forming a central air chamber therewithin open at the base thereof, partitions integrally connecting the inner sides of said walls, kerfed air inlet walls C D provided with an integral connecting perforated hood forming an air chamber therebetween open at the base thereof, partitions integrally connecting the walls C D, a kerfed air inlet wall E and a non-foraminous wall E' provided with an integrally connecting hood forming an air channel therebetween, partitions integrally connecting the walls E E', the walls B, C, forming a combustion chamber F therebetween, and the walls D E forming a combustion chamber G therebetween, each of said combustion chambers supplied with air admitted thereinto through the adjacent air inlet walls on the inner and outer circumference of the combustion chamber, substantially as set forth.

2. In combination, a base A constructed with an interior channel A' having an opening $A^5$ therewithin, an exterior surrounding channel $A^2$ communicating with the interior channel and spaced therefrom forming an opening $A^6$ intermediate the said channels, upwardly projecting kerfed air inlet walls provided with interior integral connecting partitions located upon said base about the inner and outer circumference of each of said openings forming air chambers H and J above said openings, and concentric combustion chambers F and G above said interior and exterior channels, the walls about the inner and outer circumference of each of said openings formed with an integral perforated hood at the top of said walls above the corresponding opening, a non-foraminous wall outside the outer kerfed wall and spaced therefrom forming an air chamber therebetween open at the bottom and closed at the top, the outer kerfed wall and said non-foraminous wall having an integrally connecting hood and integral partitions connecting said walls, each of said combustion chambers supplied with air admitted thereinto through the adjacent air inlet walls on the inner and outer circumference of the combustion chamber, substantially as set forth.

3. In a hydrocarbon burner, a hollow air inlet wall B kerfed horizontally to form a series of horizontal annular orifices therein, having an integral perforated hood, and interior integral vertically extended partitions connecting the inner sides of said wall, air inlet walls C D kerfed horizontally to form a series of horizontal annular orifices therein, having an integral perforated hood and vertically extended partitions therebetween integrally uniting the walls C D, an air inlet wall E kerfed horizontally to form a series of horizontal annular orifices therein, a non-foraminous wall E' spaced from the wall E, a hood connecting the walls E and E' and intermediate partitions integrally connecting said walls E E', each of said combustion chambers supplied with air admitted thereinto through the adjacent air inlet walls on the inner and outer circumference of the combustion chamber, substantially as set forth.

In testimony whereof we sign this specification in the presence of two witnesses.

EDWIN G. MUMMERY.
JOHN S. SHERMAN.
GEORGE H. HARMS.

Witnesses:
O. B. BAENZIGER,
MARY A. MARTIN.